United States Patent [19]
Cain et al.

[11] Patent Number: 5,935,627
[45] Date of Patent: Aug. 10, 1999

[54] NON-TRANS, NON-TEMPER FILLING FATS

[75] Inventors: Frederick William Cain; Helga Gerda A. Manson née van der Struik; Nico Zwikstra, all of Wormerveer, Netherlands

[73] Assignee: Loders Croklaan B.V., Wormerveer, Netherlands

[21] Appl. No.: 08/883,343

[22] Filed: Jun. 26, 1997

[30] Foreign Application Priority Data

Jun. 26, 1996 [EP] European Pat. Off. ............ 96201772

[51] Int. Cl.$^6$ ...................................... A23D 9/00
[52] U.S. Cl. ................... 426/93; 426/572; 426/606; 426/607; 426/631; 426/660; 554/223; 554/224; 554/227
[58] Field of Search ...................... 426/572, 606, 426/607, 660, 93, 631; 554/223, 224, 227

[56] References Cited

U.S. PATENT DOCUMENTS

| | | | |
|---|---|---|---|
| 5,171,604 | 12/1992 | Weyland et al. | 426/607 |
| 5,288,513 | 2/1994 | Cain et al. | 426/660 |
| 5,385,744 | 1/1995 | Cain et al. | 426/607 |
| 5,409,719 | 4/1995 | Cain et al. | 426/660 |
| 5,424,091 | 6/1995 | Cain et al. | 426/610 |

FOREIGN PATENT DOCUMENTS

| | | | |
|---|---|---|---|
| 0 460 722 A1 | 12/1991 | European Pat. Off. | A23G 1/00 |
| 0 521 549 A1 | 1/1993 | European Pat. Off. | A23G 1/00 |
| 0 547 658 A1 | 6/1993 | European Pat. Off. | A23G 3/00 |
| 555917 | 8/1993 | European Pat. Off. | |
| WO 95/14392 | 6/1995 | WIPO | A23G 1/00 |

OTHER PUBLICATIONS

Patent Abstracts of Japan, vol. 14, No. 363 (Aug. 7, 1990) (C–0746).

Primary Examiner—Carolyn Paden
Attorney, Agent, or Firm—Pillsbury Madison & Sutro, LLP

[57] ABSTRACT

A novel fat-blend for low trans filling fat compositions or for wrapper margarine that upon use do not display posthardening comprise: SUS, SSU and $SU_2$-triglyceriden, wherein:

i) the transcontent <5%
ii) SUS/SSU-wt ratio <2
iii) SUS <34 wt %
iv) $SU_2$ <55 wt %

S=saturated fatty acid 16–18 C-atoms U=mono/diunsaturated fatty acid with 18 C-atoms.

5 Claims, No Drawings

NON-TRANS, NON-TEMPER FILLING FATS

FIELD OF THE INVENTION

The invention relates to low trans, non-temper filling fats comprising a special blend of triglycerides which have the advantage of avoiding post-hardening on storage of products containing the same.

DESCRIPTION OF RELATED ART

Cool-melting, non-trans, non-temper filling fats are known from our EP 555,917. According to this European patent these compositions are obtained if blends are used, comprising 51–80 wt % of SUS-triglycerides; <5 wt % of S3-triglycerides; 7–60 wt % of (U3+U2S)-triglycerides; <40 wt % of SSU-triglycerides, while the weight ratio SUS:SSU triglycerides is <6. Although above fat compositions are excellent non-temper fat compositions we found that above compositions still displayed one disadvantageous effect, i.e. the fats posthardened too much when applied in creams on storage at about ambient temperatures. This posthardening makes the fats less appreciated by the consumer and thus also the products wherein creams made from the fats are present were less appreciated. It is further known from the prior art that this posthardening problem can be overcome by using medium hardened fat compositions, such as a medium hardened mixture of arachidic and soybean oil. However this means that less healthy fats have to be applied, because medium hardening results in the occurrence of substanstial amounts of the less healthy trans fats in the hardened fats.

We studied whether we could find a solution for above problem, however under maintaining the advantageous properties of the known fats mentioned in our earlier European Patent 555,917.

SUMMARY OF THE INVENTION

This study resulted in novel fat compositions with which the above aims could be fulfilled. These novel fats comprise fat blends for low trans filling fat compositions or for wrapper margarine comprising triglycerides of the types SUS, SSU and SU2, wherein the fat blend has a trans fatty acid content <5 wt %, preferably <2 wt % and comprises the the above aims could be fulfilled.

These novel fats comprise fat blends for low trans filling fat compositions or for wrapper margarine comprising triglycerides of the types SUS, SSU and SU2, wherein the fat blend has a trans fatty acid content <5 wt %, preferably <2 wt % and comprises the triglycerides SUS and SSU in a weight ratio SUS:SSU<2, preferably 0.5–1.5, while SUS is present in an amount <34 weight %, preferably 15–25 wt % and SU2 is present in an amount <55 wt %, preferably 30–50 wt %, which fat blend preferably displays an solid fat index, measured by NMR-pulse on unstabilised fat at 20° C. of 10–35, more preferably 15–30, most preferably 20–25, wherein S=saturated fatty acid residue with 16–18 C-atoms and U=mono and/or diunsaturated fatty acid residue with 18 C-atoms.

DETAIL DESCRIPTION OF THE INVENTION

In above definition the NMR measurement is performed on unstabilised fats, this means that the fats were subjected to the following temperature regime prior to the actual measurement: melt at 60° C.; 5 min at 60° C.; 1 hr at 0° C.; ½ hr at measurement temperature.

Above blends suitably comprise:

(i) an interesterified palm olein component with an iodine value of 50–70 and (ii) a palm oil fraction with an SUS-content of 60–80 wt %, an SSU-content of 5–30 wt %, preferably 10–25 wt % and an SU2-content of 5–15 wt %.

Alternatively the blends comprise:

(i) an interesterified Shea-olein fraction and (ii) a palm oil fraction with an SUS-content of 60–80 wt %, an SSU-content of 5–30 wt %, preferably 10–25 wt % and an SU2-content of 5–15 wt %.

The weight ratio wherein the fats (i) and (ii) defined above can be applied ranges from 60–90:40–10, preferably from 70–80:30–20.

Part of the invention are also filled chocolate bars, wherein the filling consists at least partly of the blends according to the invention. We found that our new blends do have very good aerating properties, it was found that it was easy to incorporate 25–45 vol % of air or of another gas in the fat blends. This can be achieved by whipping of the blends with a conventional whipper. Therefore our new fillings can suitably be applied for the preparation of aerated filled chocolate bars. Wrapper margarine, containing our novel fat composition are also part of our invention.

According to another embodiment of our invention our new fat blends can be used benificially as part of the filling of filled chocolate products, optionally after whipping, to avoid posthardening of the fats upon storage of the chocolate products.

EXAMPLES

1. A whipped cream was made using the following recipe:

Icing sugar 50 wt %

Fat 40"

Skimm.milk powder 10"

Fats that were applied were:

(A) a medium hardened blend of arachidic and soybean oil (ratio 65:35), having a trans content of about 35%.

(B) a mixture of wet-fractionated palm oil olein/palm oil and a palm oil fraction having 3 wt % S3; 70 wt % SUS; 14 wt % SSU and 10 wt % SU2 in a weight ratio of 20:50:30.

(C) a blend of an intersterified palm oil olein with an iodine value of 65 and a palm oil fraction having 6 wt % S3; 68 wt % SUS; 14 WT5 SSU and 10 wt % SU2 in a weight ratio of 80:20

The triglyceride composition of the different components and compositions is given below:

|  | Palm oil | Interest.Palm oil olein | wet fract. palm oil olein | (B) | (C) |
|---|---|---|---|---|---|
| SSS | 9.7 | 5.5 | 0 | 4.8 | 5.6 |
| SUS | 41.5 | 8.3 | 32.6 | 45.9 | 20.2 |
| SSU | 9.2 | 18.9 | 5.7 | 8.8 | 17.9 |
| SU2 | 33.2 | 43.7 | 50.5 | 33.2 | 37.0 | the solid fat indexes of the different fat blends (A),(B) and (C) were as follows:

|  | Blend A | Blend B | Blend C |
|---|---|---|---|
| N20 | 23.2 | 14.3 | 22.2 |
| N25 | 13 | 3.7 | 12 |
| N30 | 5.6 | 0.9 | 7.1 |
| N35 | 1.2 | 0 | 4.3 |

The ingredients were mixed in a Hobart mixer, the creams obtained were cooled to a temperature at which the mixtures could be whipped. The whip temperature and the amount of air incorporated are mentioned below:

| Fat applied | temp of whipping | % air incorp. |
|---|---|---|
| A | 16.4° C. | 36 vol % |
| B | 16.5 | 36 |
| C | 13.6 | 35 |

The creams were stored at 20° C. and the hardness of the creams were measured after different time intervalls. The results are given below:

| Fat applied | 1 day | 4 days | 14 days |
|---|---|---|---|
| A | 16 | | 29 |
| B | 68 | | 83 |
| C | | 52 | 54 |

The hardness was measured using a Stevens texture analyser, having a cone of 60°, using a speed of 0.5 mm/sec. The hardness is mentioned in grams.

From above results it can be concluded, that the posthardening was the least for the trans fat composition (A), that the posthardening was unacceptably high for composition (B) which is a composition according to EP 555,917, while for composition (C) according to the invention it was found that the posthardening was acceptable and close enough to the value found for the trans fat.

2. A whipped cream was made using the following recipe:

| | |
|---|---|
| Icing sugar | 50 wt % |
| Fat | 40 wt % |
| Skimmed milk powder | 10 wt % |

Fats that were applied were:

1. a medium hardened blend of arachidic and soybean oil (ratio 65:35), having a trans content of about 50%
2. a blend of an interesterified palm olein/shea olein, and a palm oil fraction in a weight ratio of 75/25

The tryglyceride composition of fat 2 is as given below:

| | |
|---|---|
| SUS | 23.2 |
| SSU | 19.6 |
| SU2 | 34.4 |

The solid fat indexes of the fat blends were as follows:

| | 1 | 2 |
|---|---|---|
| N20 | 24.4 | 19.4 |
| N25 | 13.0 | 10.8 |
| N30 | 4.8 | 5.5 |
| N35 | 1.0 | 2.7 |

The ingredients were mixed in a Hobart mixer, the creams obtained were cooled to a temperature at which the mixtures could be whipped. The whip temperature and the amount of air incorporated are mentioned below:

| Fat applied | Temp. of whipping | % air incorp. |
|---|---|---|
| 1. | 20.9 | 23 vol % |
| 2. | 19.6 | 19 vol % |

The creams were stored at 20° C. and at 25° C. the hardness was measured after different time intervals. The results are given below:

| Fat applied | 1 day | 1 week | 2 weeks | 1 month |
|---|---|---|---|---|
| at 20° C. | | | | |
| 1. | 34 | 49 | 56 | |
| 2. | 23 | 51 | 74 | |
| at 25° C. | | | | |
| 1. | 21 | 23 | 26 | 23 |
| 2. | 13 | 16 | 18 | 16 |

The hardness was measured using a Stevens texture analyser, having a cone of 60°, using a speed of 0.5 mm/sec and a penetration depth of 2 mm. The hardness is measured in grams.

From above results it can be concluded that a similar amount of air was incorporated in both creams and that the posthardening was the least for the trans fat composition 1., and for blend 2. according to the invention it was found that the posthardening was acceptable and close enough to the value found for the trans fat.

We claim:

1. A fat blend for low trans filling fat compositions or for wrapper margarine comprising a mixture of triglycerides of the types SUS, SSU and SU2, wherein the fat blend has a trans fatty acid content <5 wt % and comprises the triglycerides SUS and SSU in a weight ratio SUS:SSU<2, SUS is present in an amount <34 wt % and SU2 is present in an amount <55 wt %, said fat blend displaying a solid fat index, measured by NMR-pulse on unstabilized fat at 20° C. of 10–35 wherein S stands for saturated fatty acid residue with 16–18 C-atoms and U stands for at least one acid residue selected from the group consisting of mono- and di-unsaturated fatty acid residues with 18 C-atoms, said fat blend being further characterized by its resistance to posthardening of creams containing the same on storage at ambient temperature, wherein the fat blend comprises:

(i) 60 to 90 wt % of a fat component selected from the group consisting of an interesterified palm olein component with an iodine value of 50–70 or an interesterified Shea-olein fraction and (ii) 10 to 40 wt % of a palm oil fraction with an SUS-content of 60–80 wt %, an SSU-content of 5–30 wt % and an SU2-content of 5–15 wt %.

2. The fat blend of claim 1 wherein the trans fatty acid content is <2 wt %, the SUS:SSU weight ratio is 0.5–1.5, the SUS content is 15–25 wt %, the SU2 content is 30–50 wt %, the SSU content is 10–25 wt % and the solid fat index is 20–25.

3. In a method of preparing a chocolate bar including a filling comprising a fat blend, the improvement which comprises utilizing the fat blend of claim 1 as the filling.

4. Filled chocolate bar, wherein the filling comprises a blend according to claims 1.

5. Filled chocolate bar according to claim 4, wherein the filling is whipped to contain 25–45 vol % of air or another gas.

* * * * *